March 31, 1964 H. STUY 3,127,081

WIRE FEED MECHANISM

Filed Sept. 20, 1960 3 Sheets-Sheet 1

Harry Stuy,
INVENTOR.
BY.
Charles S. Haughey
ATTORNEY.

WIRE FEED MECHANISM

Filed Sept. 20, 1960 3 Sheets-Sheet 2

Harry Stuy,
INVENTOR.
BY.
Charles S. Haughey
ATTORNEY.

March 31, 1964 H. STUY 3,127,081

WIRE FEED MECHANISM

Filed Sept. 20, 1960 3 Sheets-Sheet 3

Harry Stuy,
*INVENTOR.*

*BY.*

Charles S. Haughey

*ATTORNEY.*

United States Patent Office 3,127,081

Patented Mar. 31, 1964

3,127,081
WIRE FEED MECHANISM

Harry Stuy, Garden Grove, Calif., assignor to Hughes Aircraft Company, Culver City, Calif., a corporation of Delaware Filed Sept. 20, 1960, Ser. No. 57,305
16 Claims. (Cl. 226—165)

The present invention relates to wire feed mechanism for positioning of wire leads adjacent to a semiconductor crystal for a bonding operation.

In the fabrication of transistors having a pair of leads attached to a common surface, as in a mesa type transistor, many difficulties are encountered in making the attachment of leads to the crystal on a production basis. Among these are provision of proper alignment of wires with the crystal; use of a process which lends itself to rapid and repeated operations with a minimum of maintenance of tools or equipment; and reduction of manual operations to reduce cost per unit while substantially increasing device reliability and process yield.

It is a principal object of this invention to overcome the foregoing difficulties with apparatus which is capable of adjustment to a variety of device configurations.

Another problem in bonding of fine wires to a semiconductor crystal is the production of proper spacing and tension in the wires on a repetitive basis, with a mechanism which is retractable during unloading and loading of the crystal.

A further object of this invention is to provide such spacing and tension on a reliable and repetitive basis in a retractable mechanism.

The above and other objects and advantages of this invention will be apparent from the balance of this disclosure of the preferred embodiment of the invention illustrated therein and in the accompanying drawings forming a part thereof, wherein.

Figure 1:
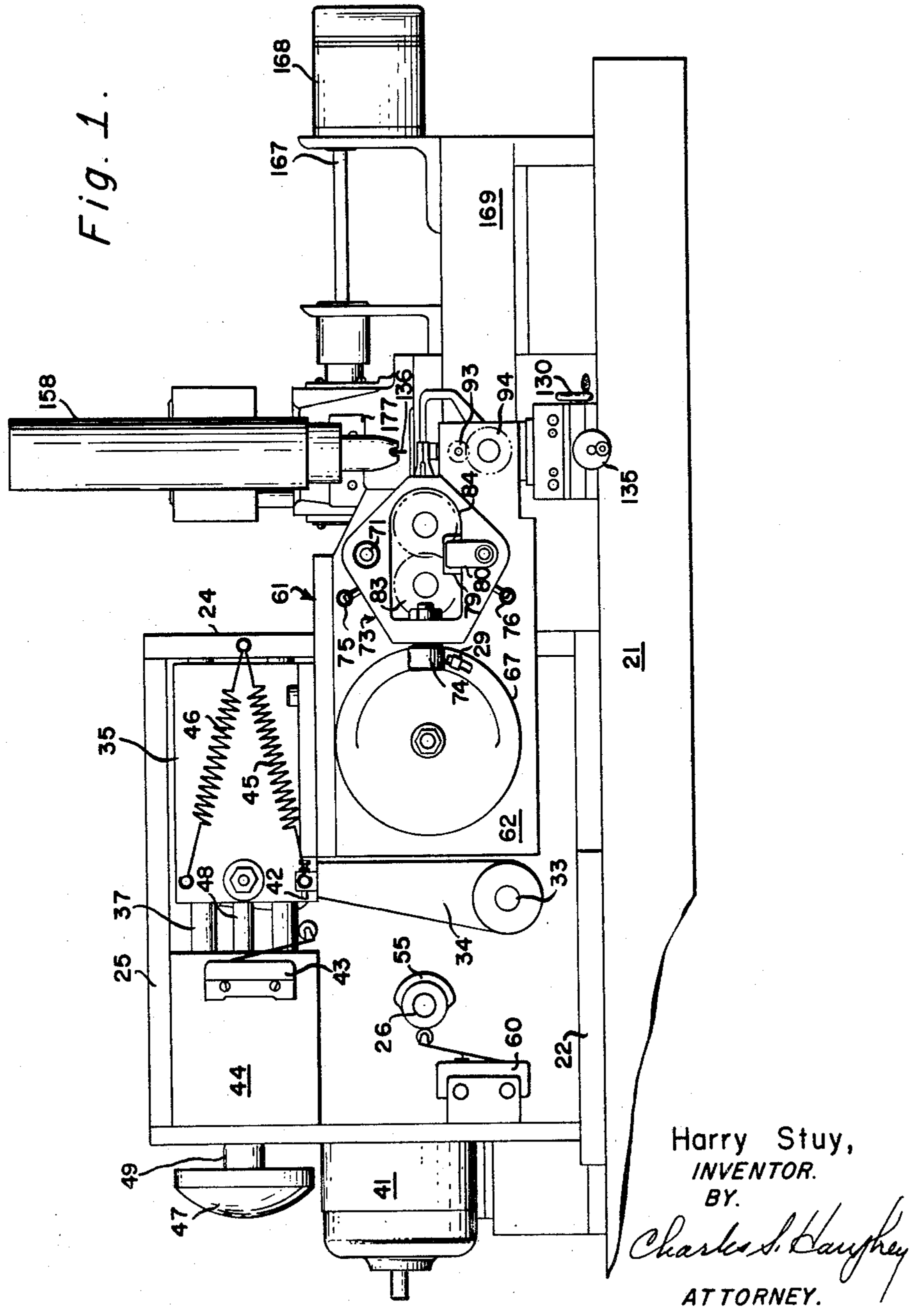
FIG. 1 is an elevational view of apparatus embodying this invention.

According to the present invention, as illustrated in the drawings, and with particular reference to FIG. 1, a wire feed mechanism is illustrated as a part of a semiconductor device thermo-compression bonding apparatus, an integrated system whose prime functional elements are a wire feeding mechanism, a device support, and a bonding chisel and atmosphere supply mechanism.

Figure 2:
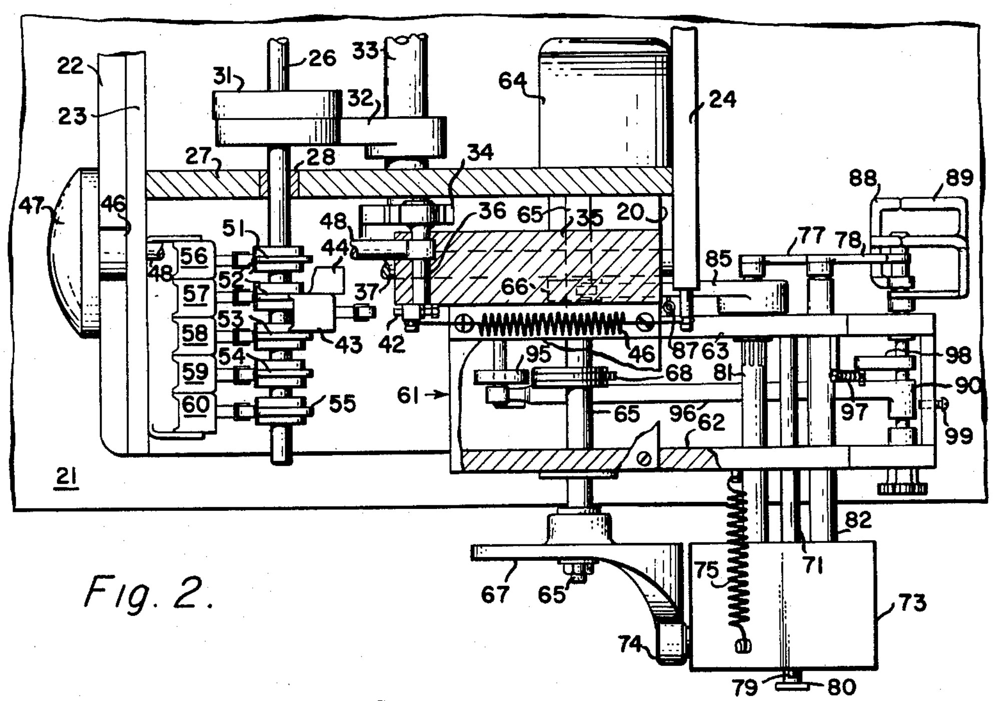
FIG. 2 is a plan view with parts in section of a portion of the apparatus of FIG. 1.
Figure 3:
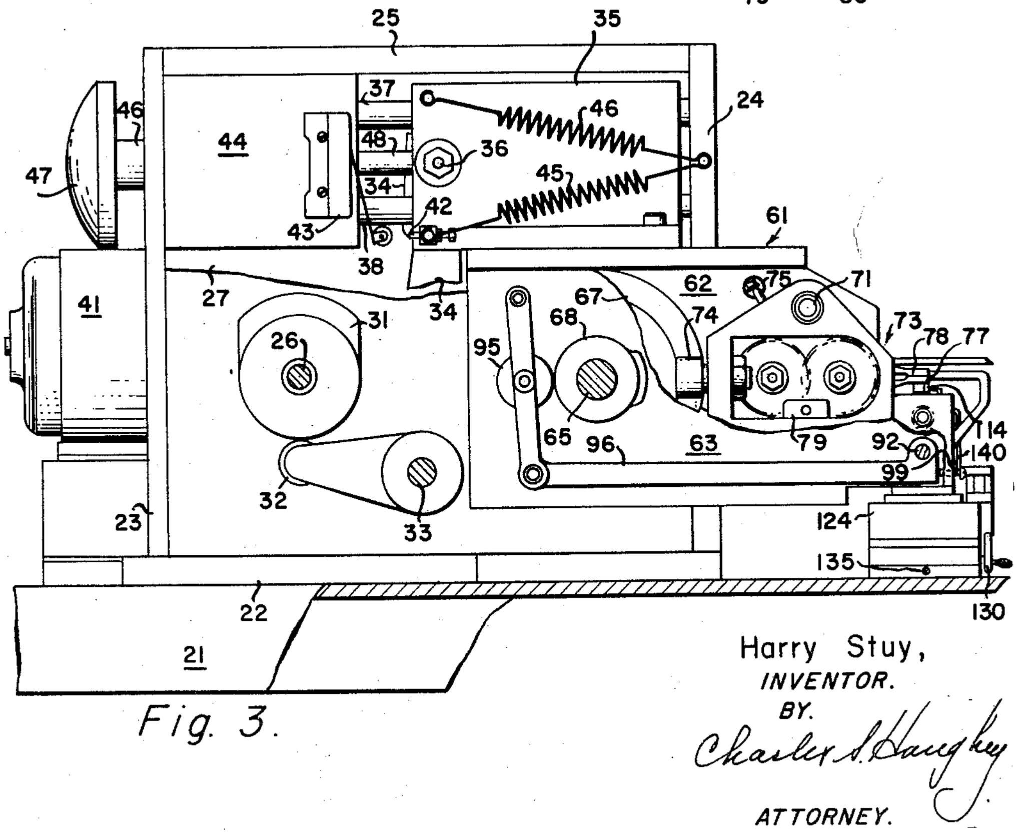
FIG. 3 is an elevational view of a portion of the apparatus of FIG. 1 with parts broken away.

The wire feed mechanism is assembled onto a base frame member 22 which is in turn supported on a rigid table 21. As shown in more detail in FIGS. 2 and 3, a wire feed mechanism support assembly, comprising side frame elements 23 and 24 and top frame element 25, is securely fastened to the base frame member 22. A wire feed mechanism translating drive shaft 26 is supported on the base frame member 22 by side frame elements including element 27 and a bearing 28 therein. A cam 31 on the shaft 26 drives a cam follower 32 which is pivotally supported on a pivot shaft 33. Arm 34 supported on shaft 33, moves a wire feed mechanism support frame 35 by a drive pin 36, the frame 35 being slideably supported, for horizontal translation, on support rods 37 and 38 rigidly secured to frame elements 23 and 24.

In operation, a main drive motor 41 drives the drive shaft 26 through a reduction gear, not shown, to rotate the cam 31. The arm 34 is moved to the left as the cam follower is actuated by the cam, forcing the support frame 35 to move to the left on support rods 37 and 38.

As the frame 35 moves to the left, an adjustable stop 42 actuates a switch 43 which is supported on the frame elements 23 and 25 by a side plate 44. Upon further turning of the shaft 26, the cam 31 allows the support frame 35 to be returned to its original position under influence of springs 45, 46 acting between the support frame 35 and the frame element 24. The rest position of the support frame 35 as shown is determined by a shoulder 49 on a handle 47 threadedly adjustable on a rod 48 secured to the drive pin 36. As the drive shaft 26 rotates, a series of cams 51, 52, 53, 54 and 55 operates a series of switches 56, 57, 58, 59 and 60 in turn as determined by the respective cams. These cam operated switches control operation of the thermo-compression bonding apparatus with relation to the wire feed mechanism so that the wire feed mechanism is retracted for reloading of a crystal after bonding, to be described, has taken place.

Figure 4:
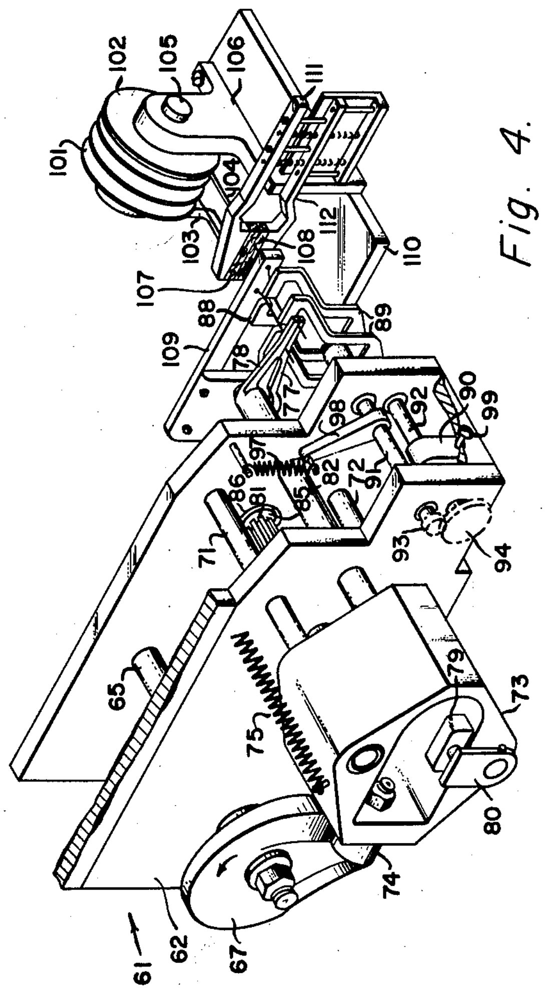
FIG. 4 is a perspective view of a portion of the apparatus of FIG. 1 showing a wire feeding mechanism in detail.

The wire feed mechanism, which is illustrated in perspective in FIG. 4, is supported on a second support means comprising a box member 61 having box sides 62, 63 secured to frame 35. A motor 64 carried by the box member drives a main shaft 65 supported on the box sides 62 and 63. The main shaft, in turn, carries motion drive cams 66, 67 and 68 together with a timing cam 69, which is preferably of the split type for adjustment of dwell time on its lobe. The cam 67 may have an extra cam lobe 29 for additional motion of the head 73.

A wire puller mechanism is supported on the box member on support rods 71, 72. A head 73 is slideably supported on the support rods 71, 72 and is driven thereon by a cam follower 74 which follows cam 67, a pair of springs 75, 76 holding the follower 74 against the cam 67. A pair of wire puller jaws 77 and 78 are supported on rotatable shafts 81, 82 carried by the head 73. The shafts carry intermeshing gears 83, 84 to rotate one of the shafts 81, 82 in a direction opposite to the rotation of the other shaft. A cam follower 85 is slideably supported in a bearing 86 and by splines on the shaft 81 in driving relation therewith to turn the shaft 81 and consequently raise the upper wire puller jaw 78; and by interaction of gears 83, 84 simultaneously drop lower wire puller jaw 77 responsive to action of the cam 66 on the main shaft 65. A spring 87 extending between the cam follower 85 and the box member 61 acts to hold the cam follower 85 in contact with the drive cam 66.

A double pair of wire spacing elements or fingers 88 and 89 is supported on turnable shafts 91 and 92 which are in turn interconnected by a pair of gears 93 and 94 for counter-rotation. To provide means for contacting a pair of wire strands spaced by the spacing elements, a cam follower 95 is connected by a linkage 96 to turn the lower shaft 92 responsive to cam 68 on the main shaft 65, acting against a spring 97 between an arm 98 on the upper shaft 91 and the box member 61. A stop 99 acting on a portion of the linkage 96 is adjustable to determine the spacing between fingers 88 and 89 in their "closed" position.

A pair of reels 101, 102 of malleable wire 103, 104 suitable for thermocompression bonding, preferably a relatively soft gold wire for bonding to a silicon semiconductor crystal, is supported on a first support means comprising a shaft 105 and its support frame 106 which are in turn supported on an extension 110 of the box member 61 to be an integral part of the wire pulling mechanism. Strands of the gold wires 103, 104 are passed through a pair of resilient wipers 107, 108 and thence through orifices in a frame member 109 designed to maintain spacing of the wire strands for purposes of automatic handling. The resilient wipers 107, 108 are supported on the extension 110 by a pair of spring biased jaws 111, 112 to maintain slight friction on the wire strands for tensioning the strands, as will subsequently appear.

In operation of the wire pulling apparatus, with the positions shown in FIG. 4, the wires are bonded to a semiconductor crystal, then severed at two points between the pairs of fingers 88 and 89, after which the fingers are rotated to an open position. The wire feed mechanism is then retracted as before explained, so that the crystal, with its wire leads now bonded, may be removed and another crystal loaded for the next lead bonding operation. On the next cycle, as switch 43 starts motor 64, the wire puller jaws 77, 78 open to release the severed ends of the wire strands 103, 104, and move toward the frame member 109, close on the ends of the wire strands projecting from the orifices therein and held by the wipers 107, 108. The wire puller jaws 77, 78 then reverse to pull the wire strands through the orifices in member 109 to the position shown in FIG. 4, after which the wire spacing fingers 88, 89 rotate to press the strands into the desired alignment as set by the adjustable stop 99. The orifices in member 109 are sufficiently large to provide wire clearance during pulling, and thus avoiding work hardening of the wire on one side which results in curling of the wires.

A bonding chisel 136 is supported on a movable carriage 158, whose vertical position is adjustable by shaft 167 turned by motor 168, which is mounted on a frame 169 on the table 21; and when a pair of properly spaced wires is positioned over a semiconductor crystal above a crystal support 114, whose position is adjustable relative to the chisel by screw elements 130 and 135, the chisel is lowered to deform the wires against the crystal and form the bond. The cam lobe 29 may be used at the start of the next cycle to move the head 73, thus the puller jaws 77, 78 pull the ends of the wires from the semiconductor crystal after bonding thereto.

With the above described apparatus wires of the order of 0.001 inch diameter may be spaced about 4 wire diameters apart with great precision and reliability.

Having disclosed the invention in its preferred form, what is claimed is:

1. Wire feed mechanism for positioning a wire strand, which comprises: a wire holder comprising resilient means for restraining the pulling of wire from said holder; wire guide means for positioning said strand adjacent said holder; a pair of spacing elements; wire pulling means for pulling said strand from said holder through the pair of spacing elements; and means for contacting said wire strand with said spacing elements between said holder and said pulling means.

2. Mechanism according to claim 1 wherein: said wire holder comprises a wire reel; a pair of resilient pads; and means for pressing said pads together whereby a wire strand from said reel passing between said pads is restrained against a pulling of the strand from said reel.

3. Mechanism according to claim 1 wherein: said wire pulling means comprises a pair of wire puller jaws; support means for supporting said jaws in movable relation to said wire guide means whereby to move said jaws toward or from said wire guide means; and jaw closure means for holding said jaws in closed position as the jaws are moved from said wire guide means.

4. Mechanism according to claim 1 and comprising first and second support means, wherein: said wire holder and said guide means are supported on said first support means; said wire pulling means and said pair of spacing elements are supported on said second support means; and comprising cam means for moving said second support means with relation to said first support means.

5. Wire feed mechanism for positioning a wire strand, comprising: first support means; a wire holder on said first support means and comprising resilient means for restraining the pulling of wire from said holder; second support means; a first pair of shafts axially and rotatably supported on said second support means; a wire puller jaw mounted on each of said first pair of shafts; means for moving said first pair of shafts axially on said second support whereby to move said jaws with respect to said wire guide means; and means for rotating each shaft of said first pair whereby to open or close said jaws.

6. Wire feed mechanism for positioning a wire strand, comprising: first support means; a wire holder on said first support means and comprising resilient means for restraining the pulling of wire from said holder; wire guide means on said first support means adjacent said holder; second support means; a first pair of shafts axially and rotatably support on said second support means; a wire puller jaw mounted on each of said first pair of shafts; means for moving said first pair of shafts axially on said second support whereby to move said jaws with respect to said wire guide means; and means for rotating each shaft of said first pair whereby to open or close said jaws.

7. Mechanism according to claim 6 and comprising a head member movably supported on said second support means for movement in directions parallel to the axes of said first pair of shafts, said first pair of shafts being rotatably mounted in fixed axial relation on said head member; means for moving said head member in a direction to and from said wire guide means and parallel to the axes of said first pair of shafts; and means for rotating the shafts of said first pair in opposite directions of rotation.

8. Mechanism according to claim 7 and comprising timing means for sequentially operating said means for moving said head member and said means for rotating said shafts.

9. Wire feed mechanism for positioning a wire strand, comprising: first support means; a wire holder on said first support means; wire guide means on said first support means; second support means; a head member; axial support means mounted on said second support for supporting said head member axially movably on said axial support means; a pair of wire puller jaws; shaft means mounted on said head member for supporting said pair of jaws in operable clamping relation; first mechanism for moving said second support means laterally to and from a position having said jaws aligned with said wire guide means for clamping a wire strand extending therefrom; second mechanism for moving said head member on said axial support means toward and from said guide means; and third mechanism for rotating said jaws, through said shaft means, between open and closed positions.

10. Mechanism according to claim 9 and comprising timing mechanism for sequentially operating said first, second and third mechanism to move said second support means into alignment with said guide means, move said jaws toward said guide means, rotate said jaws to closed position; move said jaws from said guide means; rotate said jaws to open position, and move said second support means from alignment with said guide means.

11. Wire feed mechanism for positioning wire strands, comprising: first support means; guide means mounted on said first support means, for guiding wire strands; second support means; a pair of support rods mounted on said second support means; a head member mounted on said support rods for axial movement thereon; a pair of shafts rotatably and axially movably supported on said second support means and rotatably mounted on said head member; a pair of wire puller jaws mounted each on one of said pair of shafts in operable clamping relation; means interconnecting said pair of shafts for counter-rotation with respect to each other; first cam means for moving said head member on said support rods; and second cam means for rotating at least one of said pair of shafts.

12. Mechanism according to claim 11 comprising: first and second pairs of spacing elements; first and second spacer shafts supporting the respective pairs of spacing elements and rotatably mounted on said second support means; second means interconnecting said spacer shafts for counter-rotation with respect to each other; and cam means for rotating one of said spacer shafts.

13. Mechanism according to claim 11 wherein one of said pair of shafts has a keying portion, and comprising: a rotatable bearing mounted on said second support for supporting the keying portion of said shaft, said bearing being keyed to said shaft for rotation therewith; and a follower on said bearing in operative relation with said second cam means.

14. Wire feed mechanism for positioning wire strands, comprising: a wire holder; wire guide means adjacent said holder; a support member; a pair of support rods mounted on said support member; a head member mounted on said support rods for axial movement thereon; a pair of shafts rotatably and axially movably supported on said support member; a pair of wire puller jaws mounted each on one of said shafts in operable clamping relation; means interconnecting said pair of shafts for counter rotation with respect to each other; means for moving said head member on said support rods; and second means for rotating at least one of said pair of shafts.

15. Wire feed mechanism for positioning a pair of wire strands comprising: a wire holder; wire guide means for slideably supporting said wires in spaced relation; a support member; first and second spacer shafts mounted on said support member; first and second pairs of spacing elements mounted on said respective spacer shafts; means interconnecting said spacer shafts for counter-rotation with respect to each other; and means for rotating at least one of said spacer shafts whereby to rotate said pairs of spacer elements each into contact with one of said pair of wire strands.

16. Wire feed mechanism according to claim 15 and comprising stop means for limiting rotation of said spacer shafts whereby to stop rotation of said spacer elements at a predetermined position.

References Cited in the file of this patent

UNITED STATES PATENTS

| | | |
|---|---|---|
| 1,063,504 | Burrow | June 3, 1913 |
| 1,693,728 | Rainsford | Dec. 4, 1928 |
| 1,738,592 | Leonard | Dec. 10, 1929 |
| 1,876,781 | Snyder | Sept. 13, 1932 |
| 2,380,320 | La France | July 10, 1945 |
| 2,698,081 | Rice | Dec. 28, 1954 |
| 2,919,014 | Sjobohm | Dec. 29, 1959 |
| 2,996,086 | Neff | Aug. 15, 1961 |
| 3,044,675 | Turner et al. | July 17, 1962 |